United States Patent [19]

Montone et al.

[11] 4,406,545
[45] Sep. 27, 1983

[54] METHODS OF AND APPARATUS FOR MEASURING SURFACE AREAS

[75] Inventors: Liber J. Montone, Reading; Joseph E. Yokitis, Sinking Spring, both of Pa.

[73] Assignee: Western Electric Company, Inc., New York, N.Y.

[21] Appl. No.: 261,399

[22] Filed: May 7, 1981

[51] Int. Cl.³ .................... G01B 11/28; G01N 21/47; G01N 21/55

[52] U.S. Cl. .................... 356/380; 356/51; 356/445; 356/446

[58] Field of Search ............... 356/371, 375, 379–380, 356/383–387, 399–401, 445–446, 448, 51; 250/560–563, 571

[56] References Cited

U.S. PATENT DOCUMENTS

| | | | |
|---|---|---|---|
| 2,315,282 | 3/1943 | Snow | |
| 3,185,022 | 5/1965 | Holeman | |
| 3,349,665 | 10/1967 | Grosheim et al. | |
| 3,609,044 | 9/1971 | Murphy | 356/446 |
| 3,679,820 | 7/1972 | Montone | 178/6 |
| 3,715,165 | 2/1973 | Smith | 356/120 |
| 3,793,524 | 2/1974 | Howarth | 356/446 |
| 4,105,925 | 8/1978 | Rossol et al. | 250/561 |
| 4,140,397 | 2/1979 | Gara | 356/394 |
| 4,142,105 | 2/1979 | Erdmann | 250/548 |
| 4,145,140 | 3/1975 | Fugii | 356/360 |
| 4,194,127 | 3/1980 | Schmidt | 250/572 |
| 4,213,117 | 7/1980 | Kembo et al. | 340/146.3 H |
| 4,224,513 | 9/1980 | Casey et al. | 250/571 |

OTHER PUBLICATIONS

Hammond et al., "Detecting Surface Deformities", IBM Tech. Disc. Bull., vol. 14, #1, 6-1971, pp. 49–50.
Yeich, Jr., C. R., "Automatic Article Counter," Western Electric Technical Digest #37, 1-1975, pp. 39–40.

Primary Examiner—William H. Punter
Attorney, Agent, or Firm—W. O. Schellin

[57] ABSTRACT

A technique for identifying and measuring a first surface area and apparatus for aiding such identification are disclosed. Each incremental portion of said first surface area and at least adjacent portions of surrounding surface areas are illuminated with diffuse light incident through a predetermined sectorial angle related to an anticipated waviness of the surface areas. The first surface area so illuminated is then measured by opto-electronic measuring techniques whereby measuring errors caused by shadow effects due to waviness in the surfaces are minimized by substantially uniform light dispersion within the sectorial angle.

11 Claims, 4 Drawing Figures

METHODS OF AND APPARATUS FOR MEASURING SURFACE AREAS

TECHNICAL FIELD

This invention relates generally to opto-electronically identifying surface areas. More particularly, the invention relates to methods of and apparatus for identifying surfaces which are either reflective or absorbent with respect to a predetermined threshold value, such that the area of such surfaces may, for example, be measured.

BACKGROUND OF THE INVENTION

Substances differ in their ability to absorb or reflect light of certain wavelengths. For example, metallized surfaces of semiconductor wafers are highly reflective in comparison with non-metallized silicon surfaces. Silicon surfaces tend to admit rather than reflect light, particularly light in the infrared range. Optically discernible differences can be transduced into electrically differentiated output signals in opto-electronic measuring and counting techniques.

For example, a publication by C. R. Yeich, Jr., *Technical Digest* No. 35, p. 39, 1975, Western Electric Co., discloses in relation to processing semiconductor devices, such as light emitting diodes (LEDs), opto-electronic scanning to count the number of discrete chips in an array. A TV camera is employed to view the articles and to provide a TV image of the array on a monitor screen. Certain video scan lines are selected by a line selector circuit to generate a spacing between the scan lines, such that each row of chips in the array is scanned only once. The chips are automatically counted by a counter which simply sums up the number of video pulses, one of which is generated each time a scan line passes over the image of one of the chips.

While the chips to be counted are still arranged in a close array of the original wafer, such that substantially no gaps exist between the rows and columns of the chips, the above counting technique may fail when the gaps between the rows and columns are no longer recognizable. However, other opto-electronic techniques are available, whereby surface areas which are either darker or brighter than a background or threshold level are identified and measured. According to a particular opto-electronic measuring technique, uniformly timed pulses are produced in response to a coincidence between a video signal of an image of the area to be measured and a special raster scan signal. The pulses are counted to become an indication of the size of the area. The pulse count may be calibrated, for example, by comparing the pulse count of the measured area with a pulse count of a similar area of known size.

It is readily seen that for such a measuring technique to be applied for scanning and measuring the area of chips, the boundaries of images of the chips should be sufficiently distinct over a surrounding background image to be correctly identified. Not only should the boundaries of the chips or area to be measured be distinct over such a surrounding background, but also the entire area to be measured should be of an optically distinct, reflective or absorptive value over that of the surrounding background.

Variations in a uniform brightness value occur at times over a larger area, apparently because of topographical irregularities within such area which tend to cause reflected light to scatter nonuniformly. Such topographical irregularities tend to occur in semiconductor chip arrays when a few single chips or entire groups of chips become unevenly embedded in a mounting substance, such as mounting wax, which holds the chips on a substrate after chips have been cut from a wafer. The uneven embedding results in a waviness of the top surface of the area formed by the array of chips. It is this waviness in the flatness of surfaces to be identified which causes the variations in the uniform brightness of light reflected from such surfaces. Such variations can become so great at times that darker appearing portions of generally reflective areas fall below the threshold value which identifies, for example, the generally absorptive background. It appears whenever such variations occur, errors are introduced into, for example, the measurement of areas because portions of the areas to be measured cannot be identified by the opto-electronic techniques and are mistaken for background areas.

SUMMARY OF THE INVENTION

In accordance with the present invention, a first surface area which has a light absorbency different from that of a surrounding background surface is illuminated together with adjacent surface areas of the background surface by diffuse light incident through a predetermined sectorial angle onto each incremental area of such surfaces. The surface areas are then scanned opto-electronically, and the first surface area becomes distinguished from adjacent surface areas by the difference of light absorbency. Shadow effects due to any waviness of the surface areas are minimized by substantially uniform light dispersion within the sectorial angle.

Apparatus in accordance with the invention includes a diffuse light source, such as a diffuser-illuminator screen mounted above a base for supporting an article. The distance between the screen and the base and the size of the screen is selected for the screen to occupy a predetermined sectorial angle above each incremental surface area.

BRIEF DESCRIPTION OF THE DRAWING

Various features and advantages of the present invention will become more apparent from the detailed description which may be read in reference to the accompanying drawing, wherein.

DETAILED DESCRIPTION

Figure 1:
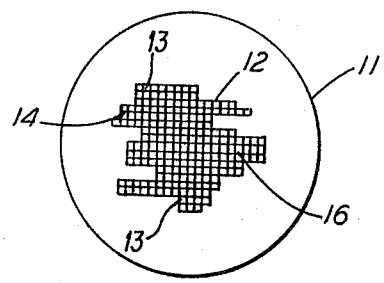
FIG. 1 is a top view of a plurality of semiconductor chips mounted in an irregular array on a preferred holder, such as a silicon slice.

In FIG. 1 there is shown a chip support slice 11 holding a plurality of semiconductor chips 12 such as, for example, chips for light emitting diodes (LEDs). The present invention is described hereunder in relation to opto-electronically counting a plurality of articles, such as the chips 12, while they are held in a close array on the slice 11. The dividing lines 13 between adjacent ones of chips 12 may be ignored, such that adjacent ones of the chips 12 may be viewed as a single area. Thus, as it will become apparent, a preferred embodiment of the invention involves opto-electronic measuring such areas. However, it should be realized from the description that measuring substantially without error is based on the correct identification of the areas to be measured. Such correct identification is also advantageous in opto-electronic pattern recognition techniques. The invention is, therefore, believed to be useful in opto-electronic pattern recognition and alignment techniques. Exposed contact surfaces 14 of the chips 12 are typically gold-coated and, consequently, form a highly reflective surface area 16. An irregular shape of the surface area 16 occupied by the individual chips 12 is formed in the particular embodiment by those of the chips 12 which remain after an entire wafer of the chips has been tested and any defective chips have been removed from the support slice 11.

For manufacturing control reasons, it is desirable to obtain a count on how many good chips 12 remain on each wafer after the defective chips have been removed. Of course, obtaining the surface area of good chips 12 and knowing their size equates to having such a count. The count of the chips is used in the analysis of possible process problems, and in determining the number of new wafer starts which may be required for maintaining a continuity in the manufacturing process. It is desirable to obtain the count quickly and accurately to aid the overall production process.

Figure 2:
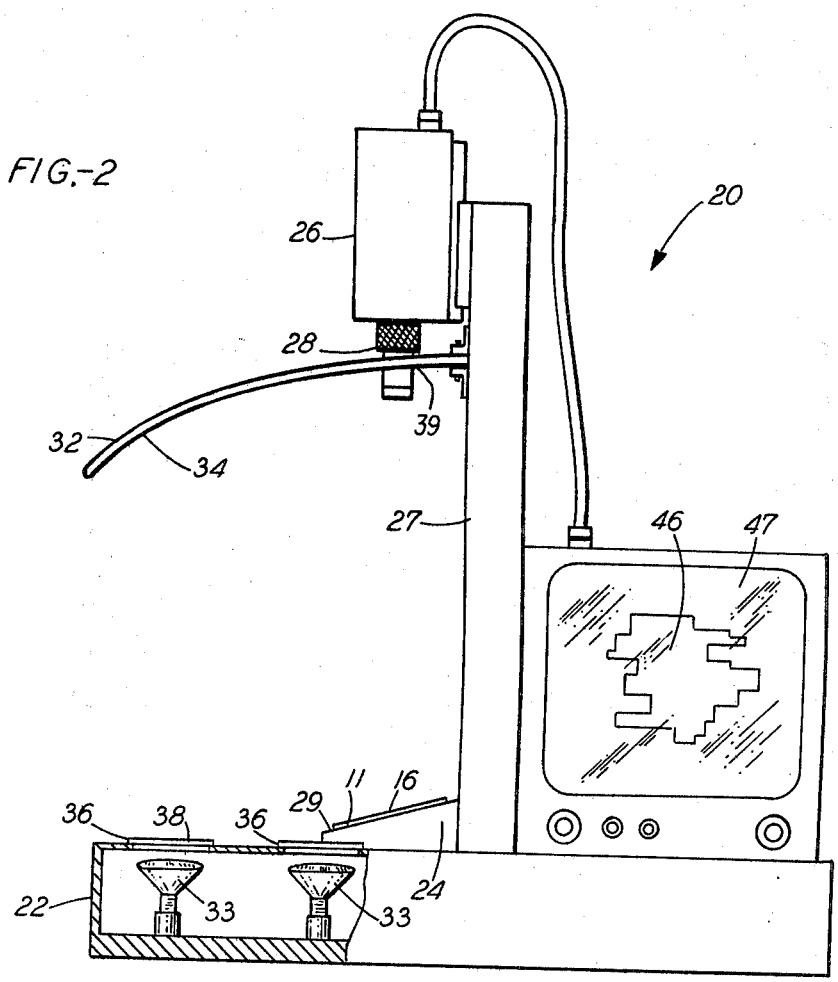
FIG. 2 is a side view of apparatus for viewing and measuring optically distinct areas, such as areas covered by the chips, for example, as shown in FIG. 1.

A method of measuring the surface area 16 without incurring common measuring errors due to light scattering from the surface area 16 is advantageously performed with the aid of apparatus 20 shown in FIG. 2. A base 22 of the apparatus 20 supports an inspection table 24. A video camera 26 is mounted to an upright support channel 27 to focus its imaging optics 28 on a top surface 29 of the table 24 or on the support slice 11 placed thereon for inspection.

Measuring errors occur as a result of an inability of the opto-electronic apparatus to consistently differentiate between the surface area to be measured and adjacent background surface areas. Waviness of the surface areas of concern has been found to be the cause of such errors. The term "waviness" is applied to surface imperfections wherein the surface orientation deviates from a theoretical flatness over measurable portions of the total surface area. Typically, a positive slope in one direction of the surface in question is followed by a negative slope with respect to the general plane of the surface, hence the term waviness.

Waviness causes irregular reflection of incident light such that some portions of an area appear darker and others appear lighter at an observation point, such as the optics 28, even though the reflectivity of the surface is substantially uniform over the entire surface area of interest. Because the angle of reflection of an impinging light beam deviates from a theoretical reflection by twice the amount of any variation from a theoretical flatness of an impinged surface, typically shallow slopes of wavy surfaces, for example, slopes of two degrees, are sufficient to cause the referred to errors.

In the described embodiment, wherein the chips 12, the total surface area 16 of which is to be measured, are mounted in a mounting material, such as mounting wax, on the support slice 11, surface irregularities akin to waviness exist. We have noticed that the chips 12, in becoming mounted to the support slice 11, often tend to assume an orientation wherein their contact surfaces 14 are nonparallel to the mounting surface and hence to the surface area 16. We refer to such nonparallel orientation of the chips 12 also as "tilt." Measurements of the degree or severity of such "tilted" or slopingly mounted chips have been made. We have found that typically a deviation of the orientation of the chips 12 of one or two degrees from a planar orientation can be expected. Such deviation results in an angular deviation of light reflected from such chips 12 of two to four degrees from a theoretically perfect reflection when the chips 12 are oriented coplanar with the surface area 16. Of course, such deviation can vary and many of the chips 12 in a particular array may be oriented substantially coplanar with the surface area 16.

Measuring errors due to irregular light reflections from the contact surfaces 14 of the chips 12 are virtually eliminated by illuminating the top surface 29 of the table 24 with a diffuse light source as further described hereunder. In a preferred embodiment, the diffuse light source is an indirect source in the form of a curved diffuser-illuminator screen 32 which is mounted to the support 27 and occupies a sector of a preferred minimum angle above the inspection table 24 of four times that of a maximum slope of any waviness in the surface areas scanned. Restating the preferred relationship between the sectorial angle through which the light is incident and the tilt or slope of the articles as a correlative, in a preferred measuring arrangement, at least some of the articles, such as the chips 12, may be tilted with respect to the support slice 11 at an angle no greater than one-fourth of the sectorial angle through which the diffuse light is impinging on the surface areas.

The screen 32 is illuminated by a plurality of directional lamps 33. In the described embodiment, as shown in the top view of the base 22 in FIG. 3, preferably three 50-watt incandescent reflector lamps 33 are mounted in the base 22 about the table 24, such that central axes of their illumination cones are directed upward toward adjacent portions of the screen 32. Again referring to FIG. 2, the curvature of the screen 32 is chosen to direct a theoretical, straight line reflection of light incident along such axes from an impinged reflective surface 34 in a general direction toward the center of the top surface 29 of the table 24.

A preferred distance between the screen 32 and the top surface 29 of the table 24 of about 28 cm ($28 \times 10^{-2}$ meter) allows access to the table 24 to position the slice 11 for inspection. A corresponding preferred size of the screen 32 of about 23 to 24 cm in length and width causes the screen to cover a conical or sectorial angle of 40 to 50 degrees above the table 24. Illumination of an area with diffuse light incident through such an angle has been found to permit inspection of a surface having a "tilt" or a waviness of at least seven degrees with respect to the top surface 29 before any significant change in the reflectivity of such surface is observed. Therefore, with a typical deviation of the orientation of the chips 12 of up to two degrees from the plane of the support slice 11, illuminating the chips 12 with diffuse light incident through a sectorial angle of, for example, thirty degrees is well within a margin of the sectorial angle being four times that of the maximum slope of any waviness of the surface areas scanned.

The reflective surface 34, in the preferred embodiment, is finished with a surface roughness which causes a diffuse reflection of any light incident on the surface 34. Ideally, the finish of the surface 34 scatters a major portion of an impinging light beam through a sectorial or conical angle of at least 20 degrees and preferably no more than 60 degrees. At such an angle an effective amount of light is diffusedly reflected from the screen 32 toward the top surface of the table 24. Thus, ideally, each incremental area of the top surface 29 is illuminated by substantially equal amounts of light from each incremental area of the reflective surface 34 of the screen 32.

A preferred surface finish may be achieved by grit blasting an initially smooth metal finish of, for example, an aluminum or steel reflector sheet. The metal surface may also be roughened and then spray-painted with a white, preferably glossy paint such that the painted surface has a reflective, yet light-scattering finish. It appears that the angle through which light from a mat or dull surface is scattered is too great, such that most of the reflected light tends to be scattered away from the top surface 29 of the table 24.

In the described embodiment, the light from the reflector lamps 33 is preferably already diffused in its path toward the screen 32 by diffuser filters 36 which are interposedly mounted between the lamps 33 and the screen 32. The filters 36 are prepared from initially transparent glass slices. At least one surface of such slices has been grit blasted to form a roughened, diffusing surface 38. Impinging the screen 32 with a diffuse light, such as with light passing through the filters 36, has been found to result in a more uniform dispersion of light reflected from the screen 32 toward the top surface 29.

The optics 28 of the video camera 26 preferably are trained on a center portion of the top surface 29 of the table 24 through an appropriately small opening 39 in the screen. By illuminating the slice 11 and the surface area 16 of chips 12 with uniformly diffused light, such as by reflection from the screen 32, the more reflective contact surfaces 14 of the chips 12 become clearly distinct from the relatively more absorbent silicon slice 11.

Figure 4:
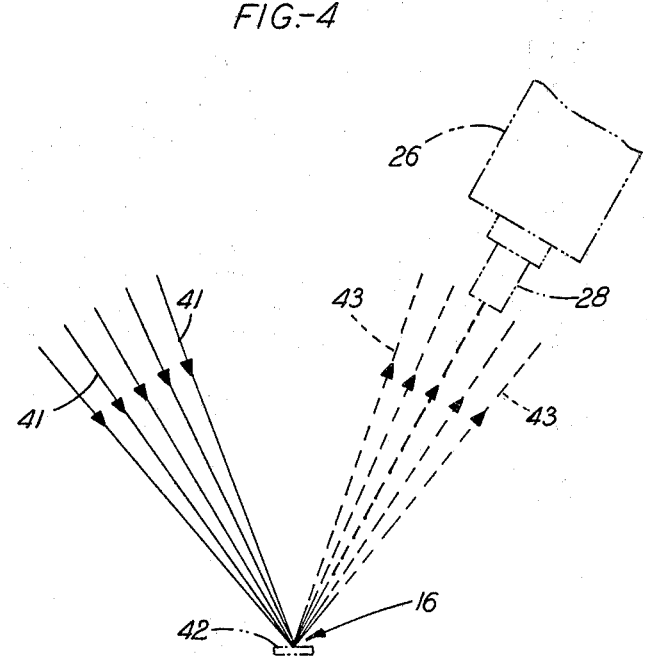
FIG. 4 is a simplified diagram of light rays impinging from various directions on a reflective surface area.

As it may be appreciated from FIG. 4, the diffused light impinging as discrete beams 41 from various directions from different, adjacent, incremental areas of the screen 32 on each and every portion 42 of the area 16 is reflected upward in similarly dispersed beams of reflection 43. Depending on the orientation of the particular impinged portion 42 of the surface area 16, only reflected beams 43 from a particular direction and originating from a particular small area of the screen will be reflected into the optics 28 of the video camera 26. If the orientation of such particular surface portion 42 were different, a reflected beam 43 impinging the surface portion 42 from a different area of the screen 32, would take the place of the reflected beam 43 shown reaching the optics 28. However, with each orientation of the particular portion 42 of the area 16, the amount of reflected light reaching the optics 28 of the camera 26 remains substantially unchanged. From FIG. 4, it can be realized that the intensity of the amount of light which is incident on the optics 28 depends, in general, on the amount of diffuse light emitted from each surface portion of the screen 32 and on the reflectivity of the surfaces of the slice 11 and the surface area 16 of the chips 12.

Referring again to FIG 2, it is further pointed out that in the described embodiment, the table 24 is tilted about 15 degrees from the horizontal to optically direct the center of reflected light from the diffuser-illuminator screen 32 toward the optics 28 of the camera 26. The apparatus 26, when having such properly centered diffuse illumination, has been found to be effective even when the general absorbency of a surface to be measured is little different from that of an adjacent background surface. In the described embodiment, a further enhancement of differences in the reflectivity was produced by a substantially absorbent, black finish of the top surface 29 of the table 26. Thus, any light transmitted through the material of the slice 11 would not be reflected upward through the slice toward the optics 28.

Figure 3:
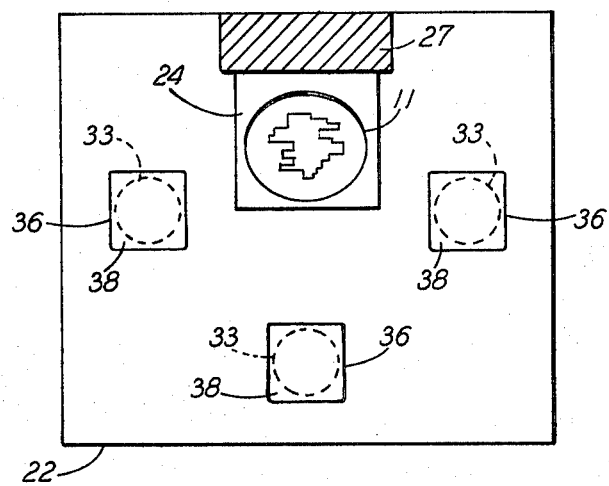
FIG. 3 is a top view of a base of the apparatus of FIG. 2, showing a particular arrangement of light sources about a measuring pedestal.

When the slice 11 is placed on the table 24, as shown in FIGS. 2 and 3, a video image 46 of the area 16 may be displayed on a video screen 47. The previously referred-to raster scan technique, wherein electronic pulses are counted while the image of the area 16 is scanned, may now be employed to determine the number of the chips 12 which remain on the slice 11. Using such a technique, a count with less than five percent error is routinely obtained without removing the chips 12 from the support slice 11.

Of course, various changes may be made in the described apparatus and methods without departing from the spirit and scope of the invention. For example, a direct, diffuse illumination source may be employed in lieu of the reflector lamps 33 in combination with the diffuser-illuminator screen 32. Such an embodiment may be realized by mounting a plurality of, for example, flourescent lamps (not shown) above the screen 32. Diffuse light from such sources may be further diffused by substituting a generally translucent screen (not shown) for the generally reflective screen 32.

Whether such alternate direct diffuse illumination or the described indirect illumination of the preferred embodiment is used, in each case the success of the techniques appears to depend on the uniformity of dispersing the light over the area to be measured and over at least adjacent portions of adjoining background areas. Ideally, a conical angle, within which light of a predetermined brightness impinges substantially uniformly on each incremental unit area of the surface to be measured and on adjacent surface areas, should be large enough to include a sufficient safety margin over any anticipated waviness of the surface to be measured and of such bordering surface areas.

In a practical application, such as the described embodiment, the conical angle within which light of substantially uniform intensity is incident toward each incremental area includes only a relatively small safety margin to provide easy access to the inspection table 24. Such desirability for access may be a reason, for example, for decreasing the size of the diffuser-illuminator screen 32. When the apparatus 20 is dedicated to measure surfaces of particular reflectivity, such as the contact surfaces 14 of the chips 12, the safety margin may be optimized by experimentation in selecting the size, the curvature and the precise position of the screen 32 above the table 24.

What is claimed is:

1. A method of identifying a first surface area having a light absorbency different from that of adjacent, second surface areas which comprises:

illuminating each incremental area of said first surface area and adjacent surface areas with diffuse light incident through a predetermined sectorial angle; and opto-electronically scanning said surface areas, whereby said first surface area becomes distinguished from adjacent surface areas by the difference of light absorbency, and shadow effects due to any waviness of said surface areas are minimized by substantially uniform light dispersion within said sectorial angle.

2. A method of identifying according to claim 1, wherein the predetermined sectorial angle is equal to at least four times the maximum slope of any waviness of the surface areas scanned.

3. A method of identifying according to claim 1, wherein the first surface area is the area of a plurality of substantially flat electronic articles mounted to a support slice and said second surface areas are surface areas of the support slice, wherein at least some of the articles are anticipated to be mounted at an angle of up to two degrees with respect to the plane of the support slice, and wherein illuminating comprises impinging each incremental area of the surface of said plurality of electronic articles with diffuse light incident through a sectorial angle of at least 30 degrees.

4. A method of identifying according to claim 1, wherein illuminating comprises:
illuminating a diffuser screen occupying a sectorial surface of the predetermined sectorial angle.

5. A method of identifying according to claim 4, wherein illuminating a diffuser screen comprises:
illuminating a diffusely reflective surface of said screen with light emitted from a plurality of directional light sources located peripherally about the first and adjacent surface areas.

6. A method of measuring a first surface area having a light absorbency different from that of adjacent, second surface areas which comprises:
diffusely illuminating each incremental surface area of the first surface area and of adjacent surface areas with light incident through a predetermined sectorial angle;
reflecting a quantity of such incident light in proportion to the reflectivity of each incremental surface area toward image forming optics;
forming an image of the surface areas wherein said first surface area is differentiated from said second surface areas by the brightness of the reflected light; and
measuring the image of the first surface area.

7. A method of measuring according to claim 6, wherein the first surface area is comprised of a plurality of substantially flat electronic articles mounted to a support slice and said second surface areas are surface areas of the support slice, and wherein at least some of the articles may be tilted with respect to the support slice at an angle no greater than one-fourth of the sectorial angle through which the diffuse light is impinging on said surface areas.

8. Apparatus for measuring a first surface area having a light absorbency different from that of adjacent, second surface areas which comprises:
a diffuser-illuminator screen;
means for supporting an article including said surface areas to orient said first surface area at a predetermined distance from said screen such that said screen occupies a predetermined sectorial angle above each incremental surface area of said first and second surface areas;
means for illuminating said screen, whereby said screen emits diffuse light to impinge on each of such incremental surface areas within such predetermined sectorial angle; and
means for opto-electronically measuring the first surface area.

9. Apparatus for measuring according to claim 8, wherein the diffuser-illuminator screen is reflective; and
means for illuminating said screen are reflector lamps mounted peripherally about said article supporting means.

10. Apparatus for measuring according to claim 8, wherein said article supporting means is an inspection table having a top surface of a substantially absorptive surface finish.

11. Apparatus for measuring according to claim 10, wherein said article is a support slice of a material which is relatively admissive of light near the infrared range and said first area to be measured are electronic chips having a relatively reflective exposed surface in comparison to that of said support slice, and wherein said electronic chips are typically mounted to said support slice in a mounting wax at orientations which tend to vary from a plane parallel to the surface of the support slice, and said sectorial angle is about four times the average angular variation of said chips with respect to said support slice.

* * * * *